(No Model.)
D. W. AYLWORTH.
HEDGE-FENCE.
No. 361,039.  Patented Apr. 12, 1887.
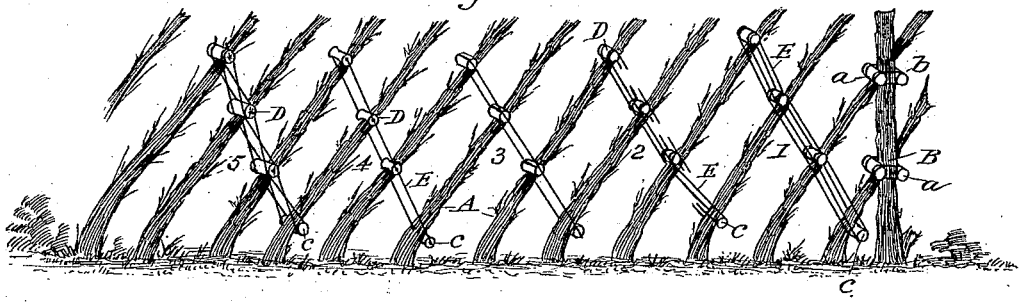
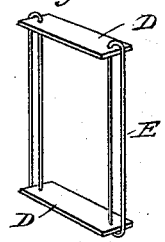
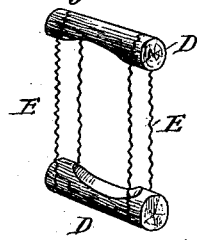
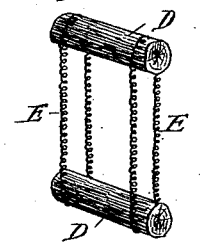
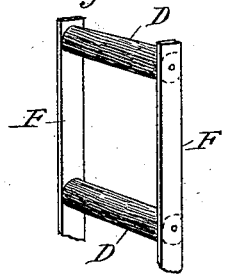
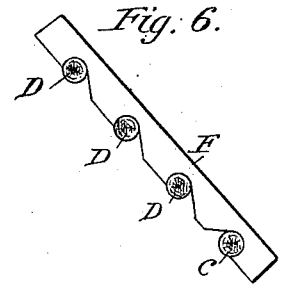
Witnesses.
Morris A. Clark
H. Hollerith
Inventor
Daniel W. Aylworth
by Franck W. Johns
his Attorney

UNITED STATES PATENT OFFICE.

DANIEL W. AYLWORTH, OF ADRIAN, MICHIGAN.

HEDGE FENCE.

SPECIFICATION forming part of Letters Patent No. 361,039, dated April 12, 1887.

Application filed February 8, 1887. Serial No. 226,963. (No model.)

*To all whom it may concern:*

Be it known that I, DANIEL W. AYLWORTH, a citizen of the United States, residing at Adrian, in the county of Lenawee and State of Michigan, have invented certain new and useful Improvements in Hedge Fences; and I do hereby declare the following to be a full, clear, and exact description of the invention, such as will enable others skilled in the art to which it appertains to make and use the same.

It is well known that to produce the best results in growing hedge fences the stalks of the plants or canes composing the hedge should be bent at an angle (preferably about forty-five degrees) in the plane of the fence and as nearly straight and parallel with each other as is possible. Various devices have heretofore been used for plashing hedges to hold the plants or canes at the desired inclination and at the same distance apart throughout their length. The plants or canes, after being bent, have been secured to each other by wire braces woven or twisted around their stalks. Staples have been passed over the stalks and secured to suitable retaining wires or bars. Pegs or spikes have been driven into the stalks, to which the retaining-wires are secured, and numerous devices of a similar nature have also been used. It is apparent that when the retaining-wires are woven or twisted around the stalks, or staples surround the same, or pegs or spikes are driven into said stalks, the plants or canes composing the hedge are more or less injured. Decay is apt to set in at the points of contact of the retaining devices, and not only produces very bad results in the growth of the hedge, but also seriously impairs its vitality. As the value of a hedge fence depends largely upon its perfect growth and lasting qualities, the objections to the above-mentioned devices for plashing can readily be appreciated.

The object of my invention is to overcome these difficulties or objections, and provide means for securing the plants or canes composing a hedge at the desired degree of inclination and at the same distance apart throughout their length, which can be readily applied, and which will not in the slightest degree mutilate or injure said plants or canes or retard the growth or impair the vitality of the same.

With this object in view my invention consists, essentially, after the plants or canes have been bent to the desired inclination, in placing on the under side of the stalks, near the ground and at suitable distances apart, transverse bars or pins, and connecting each of said bars or pins with a series of similar transverse bars or pins placed on the upper side of the stalks of the adjacent plants, so that the bars composing each series will be in a line with each other and at an inclination the reverse of the inclination of the stalks, and will receive the pressure incident to the natural upward growth of the plants or canes and hold said plants or canes in the desired position.

The particular construction and arrangement of my said invention I will now proceed to point out and describe, reference being had to the accompanying drawings, in which—

Figure 1 represents a section of hedge fence constructed in accordance with my invention; and Figs. 2, 3, 4, 5, and 6 are details showing various modifications in the form of the transverse bars or pins and the means for securing the same together.

Referring to said drawings, A represents the plants or canes composing the hedge, which are bent down in the plane of the fence at the desired inclination. At one end of a section of the hedge I place a post, B, or grow an extra plant at this point, which is permitted to grow in its natural upright position to form a post-plant.

To the post B, I secure the two adjacent plants or canes by placing on the upper sides of the plants transverse wooden bars or pins *a*, which are connected with similar transverse wooden bars or pins on the opposite side of the post by means of wire loops *b*. On the under side of the stalks of the plants or canes, and at suitable distances apart along the line of the hedge, I place transverse wooden bars or pins C, having smooth surfaces, commencing with the plant or cane next to the post. I prefer to place these bars or pins under every other stalk. They may, however, if desired, be placed farther apart, or under each stalk.
In a line with each bar or pin C, I arrange a series of similar transverse bars or pins, D, placed on the upper side of the stalks of the plants or canes, the line of each series being at an inclination the reverse of the inclination of the stalks.

The bars or pins D composing each series I connect with each other, and with one of the bars or pins C, by any suitable means, preferably by wires E, secured to the ends of the bars or pins and extending on each side of the stalks, but not touching the same.

The bars D receive the pressure incident to the natural upward growth of the plants or canes, and are thus prevented from slipping, and at the same time hold said plants or canes in their inclined position. The fastening devices being placed at frequent and regular intervals along the line of the hedge, and extending in series at an inclination from the bottom to the top of the hedge, the plants or canes are held very nearly straight and parallel with each other, and a very regular growth is produced. The transverse bars or pins may be made of metal instead of wood. I, however, prefer to use wood.

I do not wish to limit myself to any particular means for securing the transverse bars or pins to each other, as many different devices may be used for this purpose. I, however, prefer the wire fastenings attached to the ends of the bars or pins.

At 1 in Fig. 1 I show a wire loop connecting the ends of the bars. At 2, C or S shaped hooks. At 3 the loops are passed entirely around the bars or pins, but do not touch the plants or canes. At 4 I show a spool instead of the bars, the wire loops passing through the center of the spool, and at 5 continuous wires are woven around the ends of the bars.

Flat slats may be used, as shown in Fig. 2, the ends of the slats being connected by wire loops passing through holes in the slats. In Figs. 3 and 4 I show the bars connected by crimped or spiral wire. If desired, the bars may be connected by strips F, as shown in Figs. 5 and 6.

The post B may be dispensed with, and the first bar, C, at the end of a section of hedge be secured to a stake driven into the ground.

The advantages of my invention are that, while it can readily be applied and will hold the plants or canes securely at the desired inclination and at equal distances apart throughout their length, the transverse retaining bars or pins only come in contact with one side of the stalks of the plants or canes, and do not cut into the same or interfere with the flow of the sap, or in any way injure said plants or canes.

By using my invention I am able to construct a hedge fence which will have very regular growth and will possess the maximum vitality.

Having thus fully described my invention, I claim as new and desire to secure by Letters Patent—

1. In a hedge fence having the plants or canes composing the same bent as described, the transverse bars or pins placed under the stalks near their base, at suitable distances apart along the line of the hedge, in combination with the series of transverse bars or pins engaging with the upper sides of the stalks of the plants or canes, the bars or pins composing each series being in line with and connected to each other and to one of the bars or pins on the under side of the stalks, all constructed and arranged substantially as and for the purpose shown and described.

2. In a hedge fence, the combination, with the row of hedge plants or canes inclined, as described, of the transverse bars or pins C, arranged on the under side of the stalks of the plants or canes near their base, and the series of transverse bars or pins D, engaging with the upper sides of the stalks of the plants or canes, the bars or pins D composing each series being connected with each other and with one of the bars C by suitable connections, E, all constructed and arranged substantially as shown and described.

In testimony whereof I affix my signature in presence of two witnesses.

DANIEL W. AYLWORTH.

Witnesses:
R. B. ROBBINS,
T. E. GAGHAN.